No. 854,090. PATENTED MAY 21, 1907.
A. J. HANSEN.
HAY LOADER.
APPLICATION FILED JUNE 18, 1906.

3 SHEETS—SHEET 1.

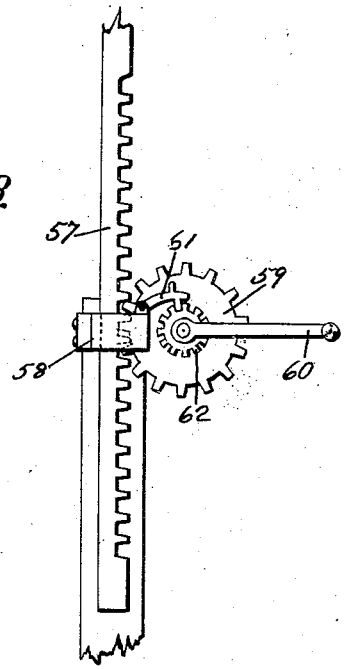
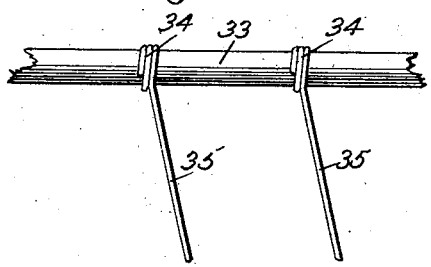
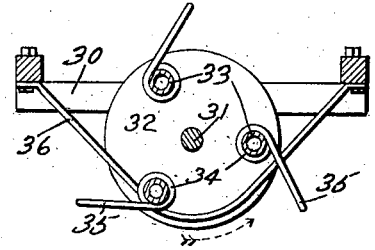

UNITED STATES PATENT OFFICE.

AUGUST J. HANSEN, OF WALNUT, IOWA.

HAY-LOADER.

No. 854,090.   Specification of Letters Patent.   Patented May 21, 1907.

Application filed June 18, 1906. Serial No. 322,635.

*To all whom it may concern:*

Be it known that I, AUGUST J. HANSEN, a citizen of the United States, residing at Walnut, in the county of Pottawattamie and State of Iowa, have invented a certain new and useful Hay-Loader, of which the following is a specification.

The object of my invention is to provide a loader of simple, durable and inexpensive construction that may be advanced over a field by draft animals and that will be of comparative light draft, and further to provide a loader of this class that will take up the hay from the field in a very thorough manner and place it upon an elevator to be carried upwardly and laterally thereby and to be discharged upon a wagon advancing alongside of the loader.

My invention consists in the construction, arrangement and combination of the various parts of the loader, whereby the objects contemplated are attained, as hereinafter more fully set forth, pointed out in my claims and illustrated in the accompanying drawings, in which—

Figure 1:
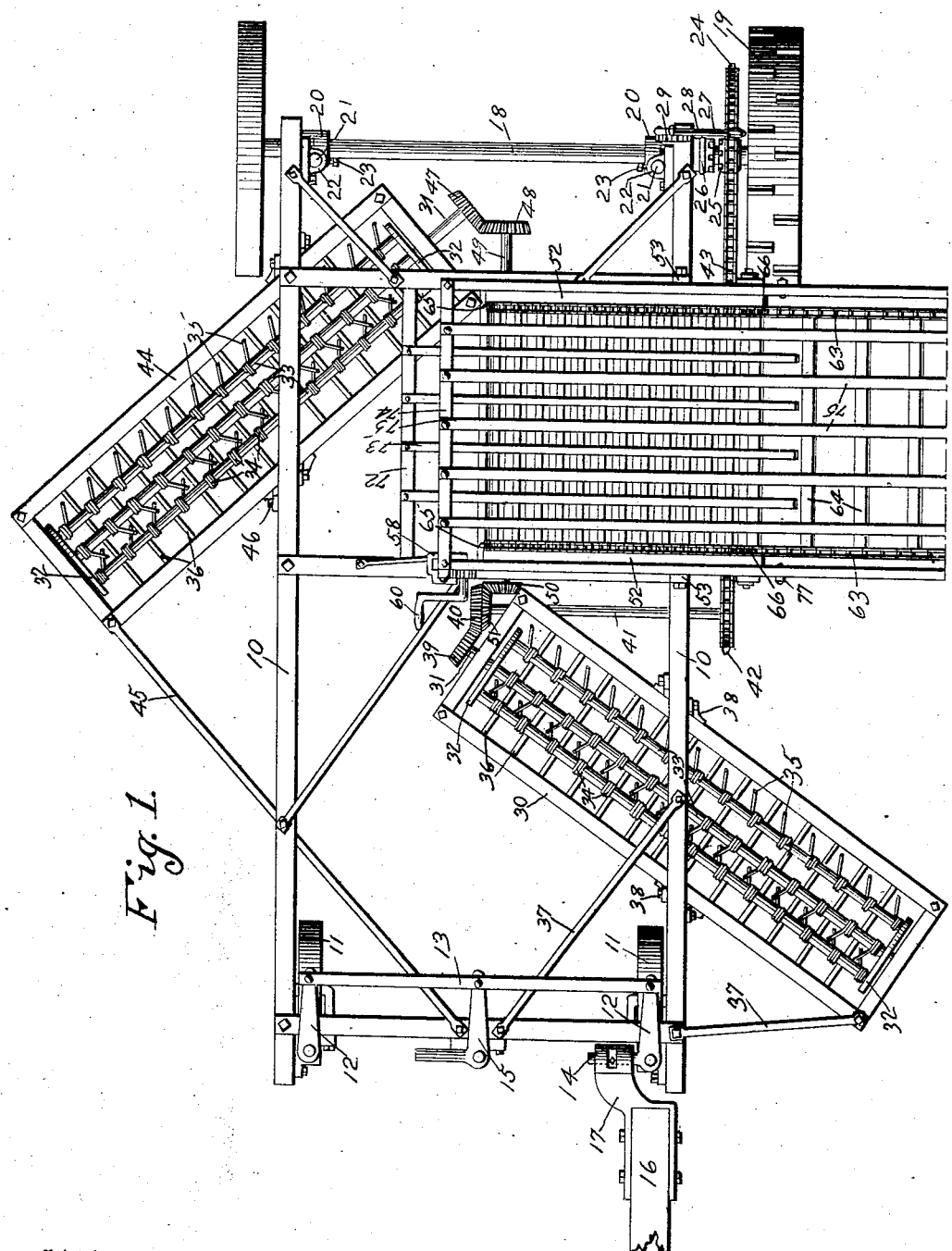
Figure 2:
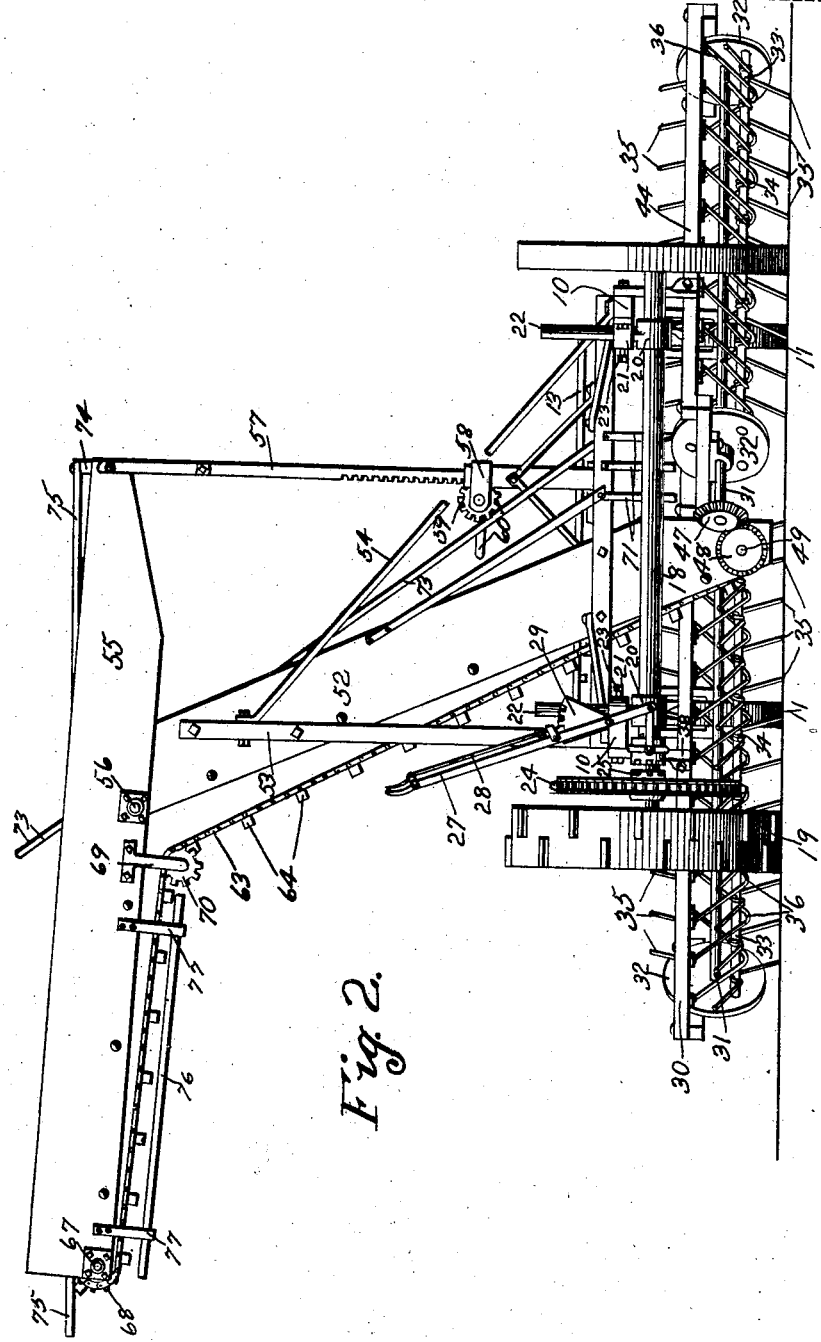

Figure 1 shows a plan view of a hay loader embodying my invention. Fig. 2 shows a rear end elevation of same. Fig. 3 shows a detail view illustrating the means for adjusting the incline of the conveyer chute. Fig. 4 shows a detail view illustrating the hay rake teeth, and Fig. 5 shows a detail, sectional view illustrating one of the hay rakes with the spring teeth thereon and the guards or scrapers to coact with the rake teeth.

Referring to the accompanying drawings, I have used the reference numeral 10 to indicate the main frame of the loader, which is supported at the front end by two caster wheels 11, each having attached to its stem a relatively projecting arm 12 and said arms pivotally connected by the bar 13. The arm 12 at the left forward corner of the frame is provided with a lateral extension 14 and pivoted to the front forward central portion of the frame is a bell-crank lever 15 having its rear end pivoted to the bar 13 and its forward end extended laterally and shaped similar to the part 14.

The tongue to which the draft animals may be attached is indicated by the numeral 16 and is provided with a lateral extension 17 designed to be fitted to either the part 14 or the extension of the bell-crank lever 15. By means of the lateral extension 17 of the tongue a straight forward pull upon the tongue will operate to advance the frame and not turn the caster wheels, but if the forward end of the tongue is turned in either direction, both caster wheels will be turned in the same direction and the frame thereby steered to follow the incline of the tongue relative to the frame. The tongue may be readily shifted from the extension 14 to the extension 15 or vice versa or according to the requirements of use to avoid side draft. The rear end of the frame is supported upon a rotatable axle 18 having fixed thereon the traction wheels 19. This axle is supported in the bearings 20, each of which has an upward extension 21 adjustably fitted in a suitable socket 22 on the frame where it is adjustably held by means of the set screw 23. In this way the rear end of the frame may be raised or lowered to thereby adjust the rakes to and from the ground surface.

Rotatably mounted on the axle 18 is a sprocket wheel 24 having a clutch member 25 and slidingly and non-rotatably mounted. On the same axle is a mating clutch member 26 controlled by a lever 27 having a spring actuated pawl 28 to engage a sector 29. The operative parts of the machine are driven from the sprocket wheel, as will hereinafter appear, and they may be easily thrown into or out of gear by the lever 27.

There are two independent rake devices for picking up hay from the field and moving it toward the elevating conveyer. Each rake device comprises a rectangular frame 30 having a rotatable shaft 31 mounted therein and extended longitudinally of the frame. Fixed to the end portions of the shaft 31 within the frame are two disks 32, each having a number of cross pieces 33 fixed thereto and extended longitudinally of the frame. On each cross piece is a series of spring rake teeth, each having one end fixed to the cross piece 33 and then a coil 34 wound upon the cross piece and a rake tooth 35 extending outwardly from the cross piece and also inclined in a direction slightly diverging from a line at right angles to the cross piece. All of said teeth incline in the same direction relative to the frame 30. A number of guards or strippers 36 are fixed to the sides of the frame 30 and extend under the cross pieces 33 to prevent hay from being wound upon and carried by the rake teeth. The forward frame has its front end projected beyond the forward left corner of the main frame and it inclines rearwardly and toward the center of the frame. It is firmly supported in this position by means of a number of braces 37 and the brackets 38. I have arranged for rotating this rake as follows: Fixed to its shaft 31 is a beveled pinion 39 in mesh with a pinion 40 fixed to the shaft 41. Said shaft 41 is rotated during the advance of the machine by means of a sprocket wheel 42 fixed to said shaft and connected with the sprocket wheel 24 by the sprocket chain 43.

A rotary rake similar to the first and indicated by the numeral 44 is fixed to the machine frame by the brace 45 and brackets 46 in position with its forward end projecting over the right side of the main frame and its body portion inclined rearwardly and toward the center of the frame. This second rotary rake is driven by means of a beveled pinion 47 or its shaft in mesh with a pinion 48 on the shaft 49, said shaft also having a beveled pinion 50 on its other end in mesh with the pinion 51 on the shaft 41, so that both rakes are rotated in unison by power derived from the main axle. In use with this portion of the device and assuming that it is being advanced over a hay field, the forward rotary rake will have its teeth engage the ground surface and move forwardly and inwardly, thus picking up all hay on the ground and moving it toward the center of the main frame. The rotary movement of the teeth in the forward rotary rake will tend to roll up the hay in substantially cylindrical form and leave it lying on the field in this form in the path of the second rotary rake. The second rake will gather up the hay that is lying to the right of the first rotary frame and will cause it to roll up in cylindrical form and move both of these rolls toward the center of the main frame near the rear end of the rear rotary rake. By having the hay left in this condition at this point, it may be easily elevated, because if any part of this roll of hay is engaged by a conveyer, the entire roll will be raised clear of the ground and none of the hay left on the ground, because the mass of hay will be rolled together in such manner that it will not be easily separated and will all travel upwardly with the conveyer or other means for elevating it.

Mounted in the main frame is an elevator chute 52 with its lower end adjacent to the rear end of the rear rotary rake and its body portion inclined upwardly and toward the right. This chute is supported by the uprights 53 and the braces 54. At its top is an auxiliary chute 55 hinged to the main chute at 56 with its inner end projecting a considerable distance beyond the hinged point. I have provided for adjusting this chute 56 as follows: Fixed to the inner end of the chute is a rake bar 57 with its lower end inserted in a stationary guide 58 mounted in the main frame. Supported adjacent to the guide 58 is a pinion 59 to engage the rake bar 57 and capable of being operated manually by the crank 60. A pawl 61 is also attached to the guide 58 to engage a notched wheel 62 connected with the pinion 59. By a manipulation of the crank 60, the rake bar 57 may be raised or lowered and held by the pawl 61 in any position of its adjustment. An endless conveyer comprising sprocket chains 63 and cross slats 64 is arranged to travel upwardly over the tops of the chutes 52 and 55 and to return under these chutes. This conveyer is driven as follows: On the shaft 49 are two sprocket wheels 65 having said chains passed around them. At the hinge point of the chutes 52 and 55 are the sprocket wheels 66 having said chains passed over them. At the outer end of the chute 55 is the shaft 67 having the sprocket wheel 68 with the chains passed around them and near the hinge joint 56 are the brackets 69 supporting the sprocket wheels 70 which have said chains passed over them.

In order to direct hay toward the chutes and to hold it firmly toward the conveyer thereof, I have provided a series of stationary guides 71 arranged vertically above the rear end of the rear rotary rake. Fixed to the main frame adjacent to the rear end of the chute 52 is a cross piece 72 with slats 73 fixed thereto and extended upwardly toward the conveyer on the chute 52 and mounted at the inner end of the chute 55 is a cross piece 74 having slats 75 extending over the conveyer on the chute 55. Beneath the outer end of the chute 55 are the longitudinal slats 76 supported by the braces 77.

In practical use and assuming that the loader is being advanced over a hay field, the draft animals attached to the tongue will steer the load either to the right or to the left when they are turned in either direction so that the driver may accurately follow a windrow of hay whether said windrow is straight or not. The forward rotary rake will first engage the windrow and, as before described, roll up the hay into a long and cylindrical row, which will lie on the ground near the center of the main frame. Then the second rotary rake will engage this row and also gather up loose hay not already contained in the roll and direct the entire roll toward the lower end of the conveyer. This conveyer, as clearly shown in the drawings, runs very close to the ground and hay forced toward it will necessarily be engaged by the cross pieces of the conveyer and carried upwardly by the conveyer. The guides and slats are arranged to prevent the roll of hay from moving away from the conveyer. A hay wagon is advanced alongside of the hay loader and the hay will be discharged into the hay wagon. The operator may adjust the incline of the upper portion of the conveyer to discharge the hay into the hay rake at different points of elevation. Furthermore the operator may by adjusting the rear axle cause the hay rakes and the lower end of the conveyer to run at the most desirable distance from the ground to accomplish the best results or when transporting the hay loader, the rear end of the frame may be elevated far enough so that none of the rake teeth will engage the roadway over which it is traveling.

Having thus described my invention, what I claim and desire to secure by Letters Patent of the United States, therefor is—

1. In a hay loader, the combination of a frame, supporting wheels therefor, a rotary hay rake mounted in the frame and extended diagonally thereof, a conveyer chute extended transversely of the frame adjacent to the rear end of the rotary hay rake, said rake arranged to move hay from beneath the side of the main frame toward the center of the frame and to the receiving end of the conveyer chute, a conveyer in said chute and means for rotating the hay rake and for advancing the conveyer.

2. In a hay loader, the combination of a frame, a rotary hay rake attached at one side of the frame and inclined rearwardly and toward the center of the frame, a second rotary hay rake at the other side of the frame and in the rear of the first, inclined rearwardly from the side of the machine to which it is attached also toward the center of the frame and a conveyer having its lower end arranged to run close to the ground and adjacent to the rear end of the rear rake and means for rotating said rakes and advancing the conveyer.

3. In a hay loader, the combination of a frame, a rake fixed to one side of the frame and extended rearwardly and toward the center of the frame, a second rake in the rear of the first attached to the opposite side of the frame and extended rearwardly and toward the center of the frame in position to engage hay that had been engaged by the first rake and left standing on the ground, a conveyer fixed to the frame and standing close to the ground adjacent to the rear end of the rear rake and means for advancing said conveyer.

4. In a hay loader, the combination of a frame, supporting wheels at the forward end thereof, supporting wheels at the rear end thereof, means for adjusting the rear end of the frame relative to the rear supporting wheels to raise and lower it relative to the ground, a forward and a rear rotary hay rake fixed to the frame and both attached to opposite sides of the frame and inclined rearwardly and toward the center of the frame and a hay elevator with its lower end close to the ground and arranged to receive hay from the rear end of the rear rake.

5. In a hay loader, the combination of a frame, a rake fixed to one side of the frame and extended rearwardly toward the center of the frame, a second rake in the rear of the first attached to the opposite side of the frame and extended rearwardly and toward the center of the frame in position to engage hay that had been engaged by the first rake and left standing on the ground, a conveyer fixed to the frame and standing close to the ground adjacent to the rear end of the rear rake, means for advancing said conveyer, a lateral extension at the top of the conveyer and means for vertically adjusting it.

6. In a hay loader, the combination of a frame, supporting wheels for the frame, a rotary hay rake fixed to one side of the frame and extended rearwardly and toward the center of the frame, a second rotary hay rake in the rear of the first attached to the other side of the frame and extended rearwardly and toward the center of the frame, a conveyer chute fixed to the frame with its lower end adjacent to the rear of the rear rake and its body portion extended laterally and away from the rear rake, an extension chute pivoted to the top of the main chute and extended laterally and means for adjusting the incline of the extension chute, a conveyer comprising chains and cross slats and extending over both chutes and arranged to return beneath them and means actuated by power derived from the frame and rotating the hay rakes and advancing the conveyer.

7. In a hay loader, the combination of a frame, a hay rake frame fixed to the main frame, a rotary shaft in said hay rake frame, two disks at the ends of the shaft, cross pieces extending between said disks and attached to them, a series of rake teeth attached to each cross piece and each made of spring wire and having a coil wound upon the cross piece with the teeth extending at a slight incline away from the line at right angles to the cross piece and curved guards fixed to the rake frame to extend under the cross bars and between the rake teeth.

Des Moines, Iowa, May 10, 1906.

AUGUST J. HANSEN.

Witnesses:
H. P. KOLL,
O. MOSHER, Jr.